INVENTOR.
Piero Cerutti

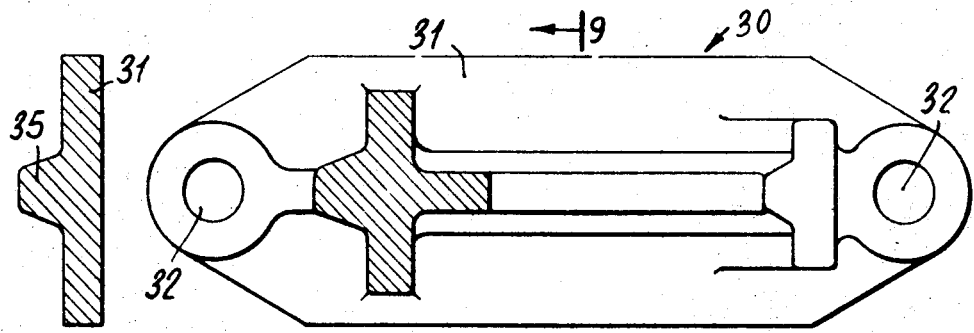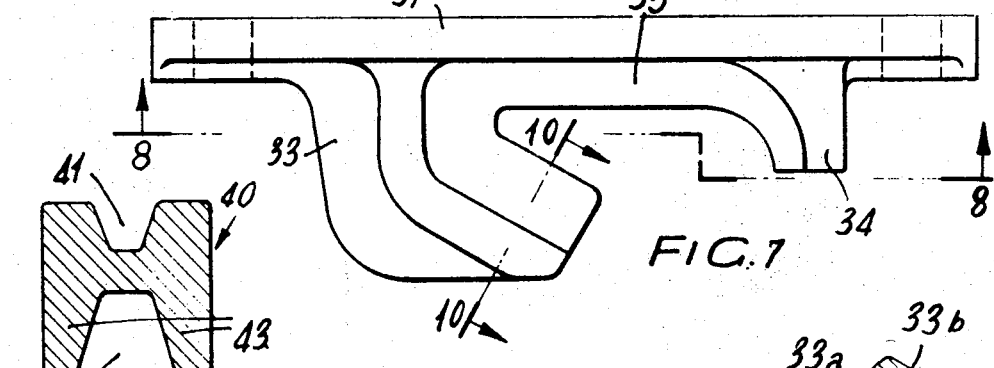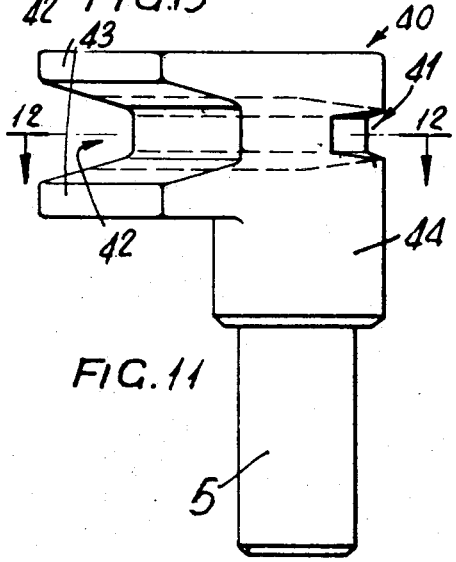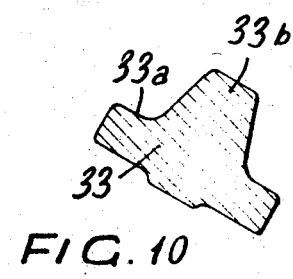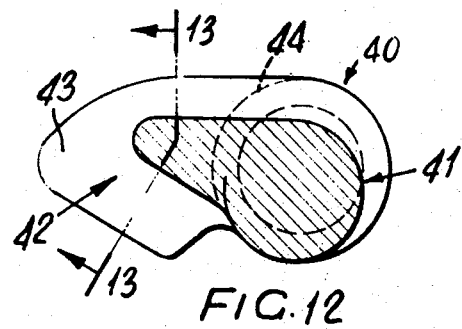

United States Patent Office 3,544,145
Patented Dec. 1, 1970

3,544,145
DEVICE FOR BLOCKING A CONTAINER
OR VAN WING
Piero Cerutti, Viale Sempione 35,
Sesto Calende, Varese, Italy
Filed July 29, 1968, Ser. No. 748,299
Claims priority, application Italy, Aug. 1, 1967,
19,076/67; Mar. 28, 1968, 14,176/68
Int. Cl. E05c 9/16
U.S. Cl. 292—54                                    4 Claims

ABSTRACT OF THE DISCLOSURE

A device for blocking a container or van door wing comprising four hooking units for the wing to the van structure as disposed at the four angles of said wing, the moving portions of which are connected two by two through two vertical rods supported by the wing so as to rotate, one of said rods being provided with a handle for causing rotation thereof while the other rod is connected to the former through two articulated quadrilateral drives.

---

This invention relates to a blocking device for container or van wing.

It is the first object of the device according to the present invention to provide for blocking a container or van wing by only acting on a handle, so that the respective operation is extraordinarily simple and quick.

It is a second object of the present invention to provide such a device of the above character which is highly sturdy, of a reasonable cost and assuring a reliable operation in use.

It is a still further object of the present invention to provide a device of the above character which will minimize the need for maintenance.

All these and other objects, which will be apparent as the following description proceeds, are attained by a device according to the present invention which is particularly characterized by comprising four hooking units for the wing to the van structure as disposed at the four angles of the wing, the moving portions of which are connected two by two through two vertical rods supported by the wing so as to rotate, one of such rods being provided with a handle for causing rotation thereof, while the other rod is connected to the former through two articulated quadrilateral drives.

According to a particular embodiment for each of the hooking units forming part of the device, the purpose is also attained of avoiding mutual displacements in a direction parallel to the axis of the rotating rod of the two stationary and moving portions, respectively, forming part of the hooking unit.

Thus, each pair of hooking units, along with the rotating rod connecting the respective moving portions, will oppose the twist forces which are applied at the top of the container or van when the latter is loaded.

Therefore, the several rotating rods with respective hooking units effectively aid in stiffening and strengthening the container or van structure, particularly as to the stresses being experienced by such twist forces (anti-rack effect).

To this end, the present invention contemplates that the stationary and moving portions of each hooking unit be provided with mutual engaging members.

The accompanying drawings diagrammatically show by way of nonrestrictive example an embodiment for the device according to the present invention, and more particularly:

Figure 1:
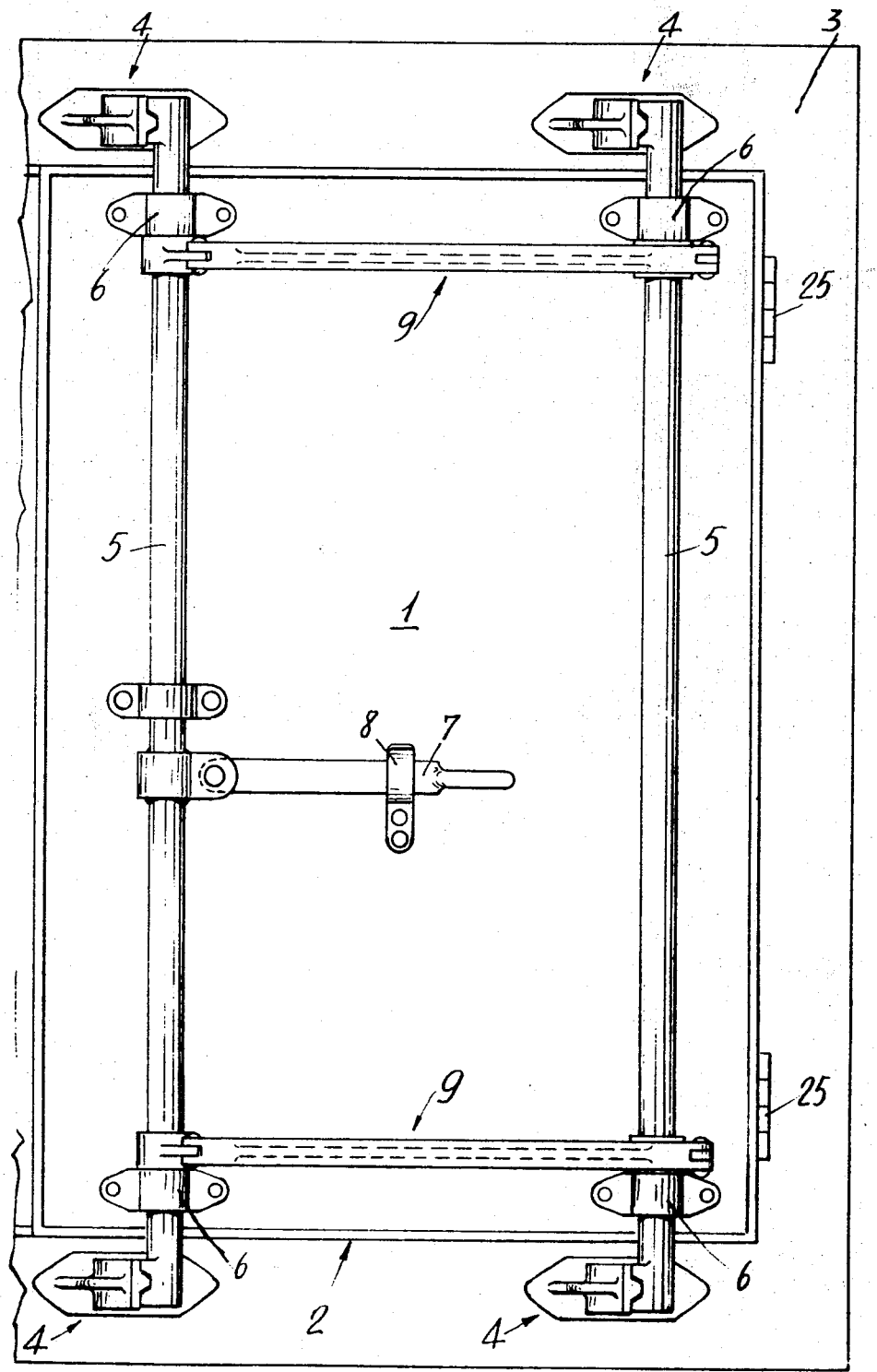
FIG. 1 is a front elevational view of the device according to the present invention as mounted at a container or van wing.

The following figures show a structural variation for each hooking unit, and more particularly:

FIG. 7 is a side elevational view showing the stationary portion for a hooking unit;

FIG. 8 is a plan view of the stationary portion of FIG. 7, partly sectioned at the nib of said stationary portion;

FIG. 9 is a cross-section of said stationary portion taken along line 9—9 of FIG. 8;

FIG. 10 is a cross-section of said stationary portion taken along line 10—10 of FIG. 7;

FIG. 11 is an elevational view showing the pawl forming the moving portion of the hooking unit fast with the end portion of the rotating rod;

FIG. 12 is a sectional view taken along line 12—12 of the pawl of FIG. 11; and

FIG. 13 is a cross-section of said pawl taken along broken lines 13—13 of FIG. 12.

Referring to FIGS. 1-6, it is seen that the device for closing and opening a wing 1 of a container or van door 2, the structure of the van being designated as a whole at 3, comprises four hooking units 4 for wing 1, disposed at the four angles of said wing 1 to removably block it to structure 3.

As better shown in the following, the moving portions of said hooking units are two by two connected through two vertical rods 5, which are supported through supporting means 6 by said wing 1 so as to rotate.

One of said rods 5 is provided with a handle 7 which, at inoperative position, is suitable for being blocked relative to wing 1 in any known manner, such as by hook 8 fast with said wing. The other rod 5 is connected to the former through two articulated quadrilateral drives, designated as a whole at 9 and to be explained hereinafter.

As particularly seen from FIGS. 2, 4, 5 and 6, each of the hooking units 4 comprises a stationary portion 10, anchored to the container or van structure 3 by bolts and provided with a projecting hook-like nib 11 having an inner abutting plane 11a inclined to the structure by an angle of about 30° and from a projection 13 protrudes, said projection 13 being of an isosceles trapezium cross-section. Each unit 4 also includes a moving portion comprising a pawl 12 fast with rotating rod 5 and shaped in a fork fashion, so as to clamp on projection 13 of nib 11.

Figure 2:
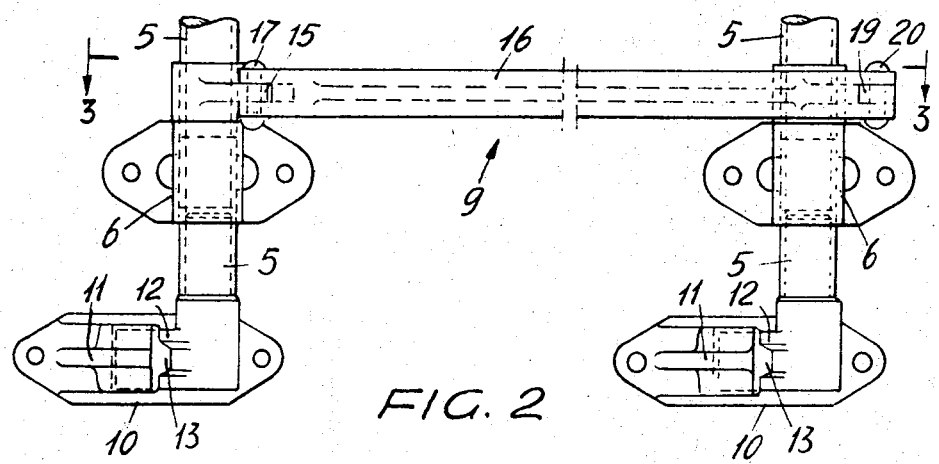
FIG. 2 is a fragmentary front elevational view of the device of FIG. 1.
Figure 3:
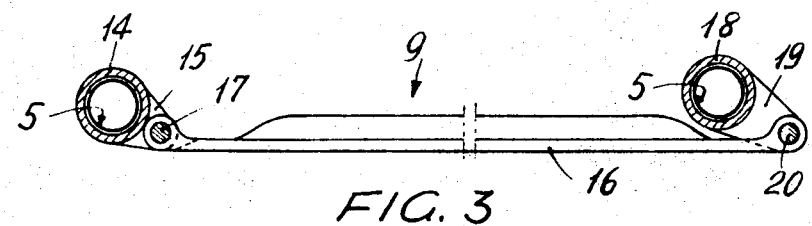
FIG. 3 is a sectional view of the assembly of FIG. 2 taken along line 3—3 of said figure.
Figure 4:
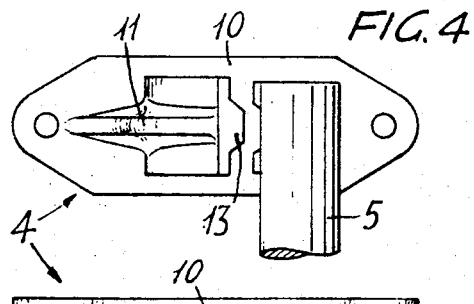
FIGS. 4, 5 and 6 are different views showing a structural detail for a hooking unit.
Figure 5:
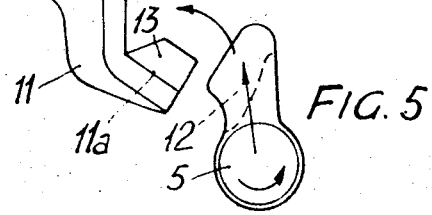

As particularly seen from FIGS. 2 and 3, each of the articulated quadrilateral drives, designated as a whole at 9, include a first equalizer comprising a ring nut 14 having a nib 15 fast with the vertical rod 5 controlled by handle 7; a connecting rod comprising a horizontal rod 16 pivoted to nib 15 through a pin 17; a second equalizer comprising a ring nut 18 having a nib 19 pivoted to the other end of rod 16 through a pin 20, said ring nut 18 being fast with the other vertical rod 5.

The structure of wing 1 between supporting means 6 for rods 5 forms the stationary rod of the articulated quadrilateral.

The two ring nuts 14 and 18 have a different length as to their respective nibs 15 and 19; preferably, nib 15 of ring nut 14 fast with rod 5 controlled by handle 7 is shorter than nib 19.

Being stated that wing 1 is capable of rotating relative to structure 3 through conventional hinges 25, the operation of the device according to the present invention is as follows:

When wing 1 is blocked at a closed position, such as that shown in FIG. 1, a slight upward rotation of handle 7 is sufficient for releasing it from hook 8, said handle 7 being then rotated so that its free end will outward move, whereby causing rods 5 (the first of which because of being directly controlled by handle 7 and the second because of being controlled through drive 9) to rotate so as to release each pawl 12 from nib 11, more particularly from projection 13 of the corresponding hooking unit.

Figure 6:
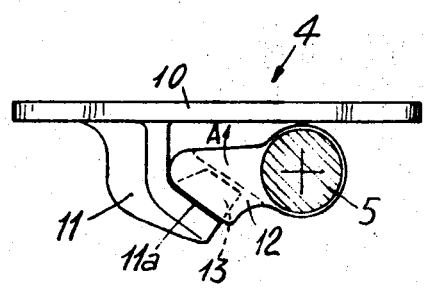

As from FIG. 6, rotation of pawl 12 particularly occurs in the direction of arrow A and, as a result, said pawl releases from the stationary portion of the hooking unit, as above mentioned.

Thus, wing 1 can be rotated about hinges 25.

Initially, such a rotation is caused by the wedge-like action as carried on by each pawl 12 against the flat zone of each stationary portion 10.

As apparent, the reverse operations shall be effected when wing 1 is open, should it be desired to close and block it at a closed position.

It should be noted that a blocking position the device according to the present invention not only will block wing 1 against structure 3, but further prevents any vertical movement owing to clamping of pawl 12 on projection 13 through its two flanges.

Referring to FIGS. 7–13, a particular embodiment for each hooking unit will now be described, by which the advantages as referred to in the preliminary section of this disclosure are attained.

Particularly referring to FIGS. 7, 8, 9 and 10, it will be seen that the stationary portion 30 of the improved hooking unit according to the present invention comprises a base plate 31 provided with holes 32 for blocking said stationary portion to the container or van structure by bolts or the like. A hook-like nib 33 projects from plate 31, said nib 33 having an inner abutting plane 33a (FIG. 10) inclined to the structure by about 30- and from which a projection 13b protrudes, said projection 33b being of an isosceles trapezium cross-section. At the end opposite nib 33, said stationary portion 33 further comprises a shoulder plate 34 which is perpendicular and connected to base plate 31. A projecting rib 35 of an isosceles trapezium cross-section extends throughout base plate 31, as well as the curved surface, and connects said plate 31 with shoulder plate 34. Said rib 35 further proceeds to reach the projecting rib 33b of nib 33.

It should be noted that, while still maintaining an isosceles trapezium section, said rib 35 progressively increases its dimensions when connecting from base plate 31 with nib 33 so as to connect with portion 33b on said nib.

Considering now FIGS. 11, 12, 13, it will be seen that pawl 40, forming the moving portion of each hooking unit according to this embodiment and fast with the end of rod 5, has a groove 41 for engaging the corresponding rib 35 in the stationary portion, said groove opening at an end within the cavity 42 between flanges 43 of the pawl and extending along the cylindrical portion 44 of said pawl.

Similarly to cavity 42, also said groove 41 is of an isosceles trapezium cross-section, however having smaller dimensions. The walls defining groove 41 are suitably connected to walls of flanges 43 defining cavity 42.

From the foregoing disclosure, it is apparent that through its groove 41 said pawl is suitable for engaging rib 35 of stationary portion 30, thus preventing any movements of two portions 30 and 40 relative to each other in a direction parallel to the axis of rotating rod 5, also when the pawl is at such a position as to allow the opening of the wing for the door to which it is attached.

Thus, the above advantages are attained, and particularly the whole structure comprising the rotating rods and hooking units effectively aids in stiffening and strengthening the container or van structure, particularly against twist forces acting thereon when at full condition.

What I claim is:

1. A device for blocking a container or van door wing, comprising four hooking units for the wing to the van structure as disposed at the four angles of said wing, the moving portions of which are connected two by two through two vertical rods supported by the wing so as to rotate, one of said rods being provided with a handle for causing rotation thereof, while the other rod is connected to the former through two articulated quadrilateral drives, each of said hooking units comprising a stationary portion anchored to the van structure and provided with a projecting hook-like nib having an inner abutting plane inclined to the structure by about 30° and from which a projection protrudes, such a projection being of an isosceles trapezium cross-section, a moving portion comprising a pawl fast with the rotating rod and suitable to penetrate the stationary portion abutting against the inclined plane of the nib thereof so that said projection cooperates with said pawl, the stationary and moving portions of each hooking unit being provided with mutual engaging members for preventing the two portions from moving to each other in a direction parallel to the axis of the rotating rod, the stationary portion of each hooking unit further comprising at the nib opposite end a shoulder plate perpendicular and connected according to a curved surface to the base plate of said stationary portion and a projecting rib extending the frusto-conical projection of the nib and extending throughout said base plate and curved surface.

2. A device according to claim 1, wherein each of the articulated quadrilateral drives comprise; a first equalizer comprising a ring nut having a nib fast with the vertical rod controlled by the handle; a connecting rod comprising a horizontal rod having an end pivoted to the equalizer; a second equalizer comprising a ring nut having a nib pivoted to the end of the connecting rod, said ring nut being fast with the other vertical rod, said wing forming the stationary rod of the articulated quadrilateral.

3. A device according to claim 2, wherein the two ring nuts have their respective nibs of a different length, the nib of the ring nut fast with the rod controlled by the handle being shorter than the other nib.

4. A hooking unit according to claim 1, wherein the pawl forming the moving portion of each hooking unit has a cylindrical portion, two flanges, and a groove for engaging the respective projecting rib of the stationary portion, said groove at an end opening within a cavity between the two flanges of said pawl and at the other end extending along the cylindrical portion of said pawl.

References Cited

UNITED STATES PATENTS

| | | | |
|---|---|---|---|
| 3,051,280 | 8/1962 | Bergman et al. | 292—48 X |
| 3,099,473 | 7/1963 | Pastva | 292—218 X |
| 3,329,456 | 7/1967 | Olander | 292—218 |
| 3,347,583 | 10/1967 | Hallberg | 292—218 X |

RICHARD E. MOORE, Primary Examiner

U.S. Cl. X.R.

292—218, 241, 340